United States Patent
Jeansonne et al.

(10) Patent No.: US 9,547,765 B2
(45) Date of Patent: *Jan. 17, 2017

(54) VALIDATING A TYPE OF A PERIPHERAL DEVICE

(71) Applicant: HEWLETT-PACKARD DEVELOPMENT COMPANY, L.P., Houston, TX (US)

(72) Inventors: Jeff Jeansonne, Houston, TX (US); Vali Ali, Cypress, TX (US); James M. Mann, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/953,065

(22) Filed: Nov. 27, 2015

(65) Prior Publication Data

US 2016/0078224 A1    Mar. 17, 2016

Related U.S. Application Data

(63) Continuation of application No. 14/118,279, filed as application No. PCT/US2011/043716 on Jul. 12, 2011, now Pat. No. 9,213,829.

(51) Int. Cl.
*G06F 21/00* (2013.01)
*G06F 21/53* (2013.01)
(Continued)

(52) U.S. Cl.
CPC .......... *G06F 21/53* (2013.01); *G06F 9/45533* (2013.01); *G06F 21/50* (2013.01); *G06F 21/56* (2013.01);
(Continued)

(58) Field of Classification Search
CPC .......... G06F 21/53; G06F 21/56; G06F 21/50; G06F 9/45533; G06F 2221/034; G06F 2009/45579; G06F 2009/45587
(Continued)

(56) References Cited

U.S. PATENT DOCUMENTS 6,003,065 A * 12/1999 Yan .......................... G06F 13/10
                                                    709/200
7,340,582 B2 * 3/2008 Madukkarumukumana
                                ............................. G06F 11/0712
                                                    711/100

(Continued)

FOREIGN PATENT DOCUMENTS

KR    10-2009-0068833    6/2009
KR    10-2009-0100614    9/2009
(Continued)

OTHER PUBLICATIONS

Byron Acohido, USA Today news article, Jetliner crash shows dangers of using tainted USB sticks, Aug. 23, 2010 (3 pages).

(Continued)

*Primary Examiner* — David Garcia Cervetti
(74) *Attorney, Agent, or Firm* — HP Patent Department (57) ABSTRACT

A plurality of virtual domains are isolated from one another by a virtual machine monitor (VMM), the plurality of virtual domains including a first guest domain and a privileged domain. Peripheral related instructions are isolated from the first guest domain. The privileged domain is to cause execution of the peripheral related instructions, where the peripheral related instructions upon execution validate a type of the peripheral device.

20 Claims, 6 Drawing Sheets (51) Int. Cl.
  *G06F 9/455* (2006.01)
  *G06F 21/50* (2013.01)
  *G06F 21/56* (2013.01)
(52) U.S. Cl.
  CPC ............... *G06F 2009/45579* (2013.01); *G06F 2009/45587* (2013.01); *G06F 2221/034* (2013.01)
(58) Field of Classification Search
  USPC ..................................... 726/3, 6, 23, 26, 11
  See application file for complete search history.

(56) References Cited

U.S. PATENT DOCUMENTS

| | | | |
|---|---|---|---|
| 7,797,682 B2 | 9/2010 | Stocker | |
| 7,797,748 B2 | 9/2010 | Zheng et al. | |
| 7,877,788 B1* | 1/2011 | Topp | G06F 21/85 713/189 |
| 8,230,149 B1* | 7/2012 | Long | G06F 13/12 710/305 |
| 8,327,358 B2* | 12/2012 | Mangione-Smith | G06F 9/5077 717/121 |
| 8,527,982 B1* | 9/2013 | Sapuntzakis | G06F 9/45558 717/174 |
| 8,924,708 B2* | 12/2014 | Yoffe | G06F 21/30 713/152 |
| 8,966,475 B2* | 2/2015 | Srinivasan | G06F 9/4856 717/174 |
| 2002/0186121 A1* | 12/2002 | Yoshikawa | G07C 9/00111 340/5.28 |
| 2003/0037237 A1* | 2/2003 | Abgrall | G06F 21/53 713/166 |
| 2003/0105849 A1* | 6/2003 | Iwamoto | G06F 21/604 709/223 |
| 2003/0115147 A1* | 6/2003 | Feldman | G06F 21/10 705/64 |
| 2003/0167336 A1* | 9/2003 | Iwamoto | G06F 21/604 709/229 |
| 2003/0226031 A1* | 12/2003 | Proudler | G06F 21/57 726/16 |
| 2004/0221173 A1* | 11/2004 | Moyer | G06F 13/4013 713/189 |
| 2004/0254013 A1* | 12/2004 | Quraishi | G07F 17/32 463/29 |
| 2004/0254014 A1* | 12/2004 | Quraishi | G07F 17/3202 463/29 |
| 2005/0138433 A1* | 6/2005 | Linetsky | G06F 21/31 726/19 |
| 2006/0029062 A1* | 2/2006 | Rao | H04L 12/2856 370/389 |
| 2006/0041761 A1* | 2/2006 | Neumann | G06F 21/32 713/189 |
| 2006/0075285 A1* | 4/2006 | Madukkarumukumana | G06F 11/0712 714/5.11 |
| 2006/0200819 A1* | 9/2006 | Cherkasova | G06F 9/45533 718/1 |
| 2006/0200820 A1* | 9/2006 | Cherkasova | G06F 11/3423 718/1 |
| 2006/0200821 A1* | 9/2006 | Cherkasova | G06F 11/3423 718/1 |
| 2007/0226497 A1* | 9/2007 | Taylor | G06F 21/31 713/168 |
| 2008/0028076 A1* | 1/2008 | Gupta | G06F 9/4881 709/226 |
| 2008/0028397 A1* | 1/2008 | Gupta | G06F 9/5077 718/1 |
| 2008/0028398 A1* | 1/2008 | Cherkasova | G06F 9/5077 718/1 |
| 2008/0028399 A1* | 1/2008 | Gupta | G06F 9/5077 718/1 |
| 2008/0028410 A1* | 1/2008 | Cherkasova | G06F 9/5061 718/104 |
| 2008/0028411 A1* | 1/2008 | Cherkasova | G06F 9/5027 718/104 |
| 2008/0151847 A1* | 6/2008 | Abujbara | H04W 12/06 370/338 |
| 2008/0263363 A1* | 10/2008 | Jueneman | G06F 21/32 713/184 |
| 2008/0293499 A1* | 11/2008 | Brewer | G07F 17/32 463/47 |
| 2009/0007100 A1* | 1/2009 | Field | G06F 21/53 718/1 |
| 2009/0055841 A1* | 2/2009 | Huang | G06F 3/0622 719/326 |
| 2009/0113128 A1* | 4/2009 | Zhao | G06F 21/57 711/115 |
| 2009/0138963 A1* | 5/2009 | Sato | G06F 12/1441 726/17 |
| 2009/0138969 A1* | 5/2009 | Kim | G06F 21/51 726/22 |
| 2009/0144465 A1* | 6/2009 | Sato | G06F 21/78 710/37 |
| 2009/0182805 A1* | 7/2009 | Shivaji-Rao | G06F 17/30194 709/203 |
| 2009/0182860 A1* | 7/2009 | Hwang | G06F 21/606 709/223 |
| 2009/0187726 A1* | 7/2009 | Serebrin | G06F 9/455 711/202 |
| 2009/0222814 A1 | 9/2009 | Astrand | |
| 2009/0239502 A1* | 9/2009 | Dempo | H04L 12/4011 455/411 |
| 2009/0271861 A1* | 10/2009 | Yoshida | G06F 21/74 726/17 |
| 2009/0300717 A1* | 12/2009 | Mandava | G06F 21/554 726/2 |
| 2009/0307705 A1 | 12/2009 | Bogner | |
| 2010/0031325 A1* | 2/2010 | Maigne | G06F 9/45533 726/4 |
| 2010/0083385 A1* | 4/2010 | Uchida | G06F 21/606 726/30 |
| 2010/0107160 A1* | 4/2010 | Srinivasan | G06F 21/57 718/1 |
| 2010/0125679 A1* | 5/2010 | Tang | G06F 9/4411 710/8 |
| 2010/0153617 A1* | 6/2010 | Miroshnichenko | G06F 3/061 711/6 |
| 2010/0161847 A1* | 6/2010 | Riddoch | G06F 12/145 710/22 |
| 2010/0175108 A1 | 7/2010 | Protas | |
| 2010/0228943 A1* | 9/2010 | Deshpande | G06F 12/1081 711/206 |
| 2010/0228945 A1* | 9/2010 | Deshpande | G06F 12/0815 711/207 |
| 2010/0228973 A1* | 9/2010 | Dancer | H04L 12/58 713/168 |
| 2011/0047378 A1* | 2/2011 | Chen | H04L 9/3226 713/168 |
| 2011/0060947 A1* | 3/2011 | Song | G06F 21/53 714/37 |
| 2011/0078797 A1* | 3/2011 | Beachem | G06F 21/53 726/25 |
| 2011/0083017 A1* | 4/2011 | Ali | G06F 21/34 713/185 |
| 2011/0099639 A1* | 4/2011 | Hwang | G06F 21/50 726/27 |
| 2011/0141124 A1* | 6/2011 | Halls | G06F 21/83 345/522 |
| 2011/0145814 A1* | 6/2011 | Mangione-Smith | G06F 9/5077 718/1 |
| 2011/0145821 A1* | 6/2011 | Philipson | G06F 21/83 718/1 |
| 2011/0145886 A1* | 6/2011 | McKenzie | G06F 21/83 726/1 |
| 2011/0154023 A1* | 6/2011 | Smith | G06F 21/78 713/155 |

(56) References Cited

U.S. PATENT DOCUMENTS

| | | | |
|---|---|---|---|
| 2011/0191825 A1* | 8/2011 | Kageyama | G06F 21/00 726/3 |
| 2011/0205965 A1* | 8/2011 | Sprigg | G06F 9/4411 370/328 |
| 2011/0246678 A1* | 10/2011 | Wu | G06F 3/038 710/11 |
| 2011/0246756 A1* | 10/2011 | Smith | H04L 9/3252 713/2 |
| 2011/0296411 A1* | 12/2011 | Tang | G06F 9/45545 718/1 |
| 2011/0314288 A1* | 12/2011 | Yogev | G06F 21/31 713/172 |
| 2012/0005178 A1* | 1/2012 | Gazala | G06F 3/1204 707/705 |
| 2012/0011397 A1* | 1/2012 | Murakami | G06F 11/0712 714/15 |
| 2012/0023265 A1* | 1/2012 | Liao | G06F 13/387 710/5 |
| 2012/0023270 A1* | 1/2012 | Nadehara | G06F 9/468 710/22 |
| 2012/0042099 A1* | 2/2012 | Wong | G06F 21/44 710/9 |
| 2012/0047566 A1* | 2/2012 | Andersson | G06F 21/31 726/7 |
| 2012/0047580 A1* | 2/2012 | Smith | G06F 21/53 726/24 |
| 2012/0095919 A1* | 4/2012 | Hart | G06Q 20/12 705/44 |
| 2012/0110661 A1* | 5/2012 | Tverskoy | A61B 5/0002 726/16 |
| 2012/0131230 A1* | 5/2012 | Ady | G06F 21/44 710/8 |
| 2012/0131353 A1* | 5/2012 | Nasir | G06F 21/42 713/189 |
| 2012/0161924 A1* | 6/2012 | Lin | H04W 12/06 340/5.8 |
| 2012/0204233 A1* | 8/2012 | Rubio | H04L 67/16 726/4 |
| 2012/0284712 A1* | 11/2012 | Nimmagadda | G06F 9/5077 718/1 |
| 2012/0290455 A1* | 11/2012 | Mays | G06F 9/5072 705/34 |
| 2012/0311207 A1* | 12/2012 | Powers | G06F 13/385 710/106 |
| 2012/0311257 A1* | 12/2012 | Berman | G06F 3/0605 711/115 |
| 2013/0067534 A1* | 3/2013 | Soffer | G06F 3/0227 726/2 |
| 2013/0340069 A1* | 12/2013 | Yoffe | G06F 21/30 726/17 |
| 2014/0068248 A1* | 3/2014 | Kobres | G06F 21/82 713/155 |
| 2014/0188732 A1* | 7/2014 | Kobres | H04L 63/0442 705/64 |
| 2014/0241523 A1* | 8/2014 | Kobres | G06F 21/71 380/28 |
| 2014/0247197 A1* | 9/2014 | Margulis | G06F 1/266 345/2.3 |
| 2014/0268229 A1* | 9/2014 | Kempka | G06F 9/4413 358/1.15 |
| 2014/0281527 A1* | 9/2014 | Kobres | G06F 21/44 713/168 |
| 2014/0283076 A1* | 9/2014 | Muttik | G06F 21/554 726/24 |
| 2015/0082422 A1* | 3/2015 | Yoffe | G06F 21/30 726/16 |

FOREIGN PATENT DOCUMENTS

| | | |
|---|---|---|
| KR | 10-2011-0055391 | 5/2011 |
| TW | 200519583 A | 6/2005 |
| TW | 200943187 A | 10/2009 |

OTHER PUBLICATIONS

Erik Couture, SANS Institute, InfoSec Reading Room, USB—Ubiquitous Security Backdoor, Aug. 25, 2009 (25 pages).

European Patent Office, Communication pursuant to Rules 161(2) and 162 EPC for EP Appl. No. 11869372.0 dated Feb. 19, 2014 (3 pages).

European Patent Office, Extended European Search Report for EP Appl. No. 11869372.0 dated Mar. 30, 2015 (7 pages).

International Search Report and Written Opinion received in PCT Application No. PCT/US2011/043716, mailed on Feb. 9, 2012, 9 pgs.

Juniper Networks Introduces Virtualized Security Solution for Private and Public Clouds, <http://webcache.googleusercontent.com/search?q=cache: U-7obCAQme4J: www.provision.ro/threat-management/network-and-telecommunication-security/enterprise-network-firewall/juniper-networks-introduces-virtualized-security-solution-for-private-and-public-clouds+>, Feb. 17, 2011 (3 pages).

Office Action, CN Application No. 201180071768.2, Date: Jun. 26, 2015, pp. 1-10.

Seth Fogie, Informit, Getting Owned: The USB Keystroke Injection Attack dated Oct. 6, 2010 (4 pages).

The International Bureau of WIPO, International Preliminary Report on Patentability for International Appl. No. PCT/US2011/043716 dated Jan. 23, 2014 (6 pages).

VMWare, Harness the Power of Desktop Virtualization, http://www.vmware.com/products/ace/overview.html; retrieved on Jun. 10, 2011 (1 page).

\* cited by examiner

VALIDATING A TYPE OF A PERIPHERAL DEVICE

CROSS REFERENCE TO RELATED APPLICATIONS

This is a continuation of U.S. application Ser. No. 14/118,279, filed Nov. 18, 2013, which is a national stage application under 35 U.S.C. §371 of PCT/US2011/043716, filed Jul. 12, 2011, both hereby incorporated by reference.

BACKGROUND

A virtual machine is a software implementation of a machine that executes instructions like a physical machine. The virtual machine is susceptible to the same malicious attacks as a physical machine. Plug and play can allow a peripheral to be connected to a machine without user involvement to configure the peripheral. If the peripheral was malicious it may infect the virtual machine.

BRIEF DESCRIPTION OF THE DRAWINGS

Some embodiments of the invention are described with respect to the following figures.

DETAILED DESCRIPTION

A computing device may be susceptible to attacks by malicious code. The computing device may be for example a server, desktop, notebook, cell phone, PDA, or another computing device. The malicious code may be for example, malware, viruses, firmware attacks or other. A computing device can execute an operating system which may be attacked by viruses or malware.

A virtual machine may also be known as a virtual domain for hosting an operating system executing in the virtual domain. A physical machine may execute multiple domains. An operating system executing on a domain is susceptible to an attack by viruses and malware that can attack the operating system if executing directly on the physical hardware of the computing device. The domains can be managed and isolated from one another by a hypervisor also known as a virtual machine monitor or in conjunction with one of the domains such as a privileged domain. Each domain on a computing device can execute a peripheral related task. A peripheral related task can be logic or instructions that determine if a peripheral is malicious. A virtual appliance may be used for the purpose of executing the peripheral related task. A virtual appliance can run in a domain. The peripheral related task can scan a peripheral that is attached to the computing device to prevent the peripheral from attacking another domain.

In one example a computing device includes a first guest domain and a peripheral related task isolated from the first guest domain. A port can connect the computing device to a peripheral device. A privileged domain can cause the peripheral related task to be executed to identify the peripheral device. The peripheral related task prevents the first guest domain from communicating with the peripheral if it is determined malicious.

In another example, a method of communicating with a peripheral connected to a computing device includes isolating a peripheral related task from a first guest domain. A virtual appliance can be generated to execute the peripheral related task. The virtual appliance can receive from the peripheral an indication of the type of peripheral. The virtual appliance can validate the type of peripheral. Communication with the peripheral by the first guest domain can be prevented until the type of peripheral is validated.

Figure 1:
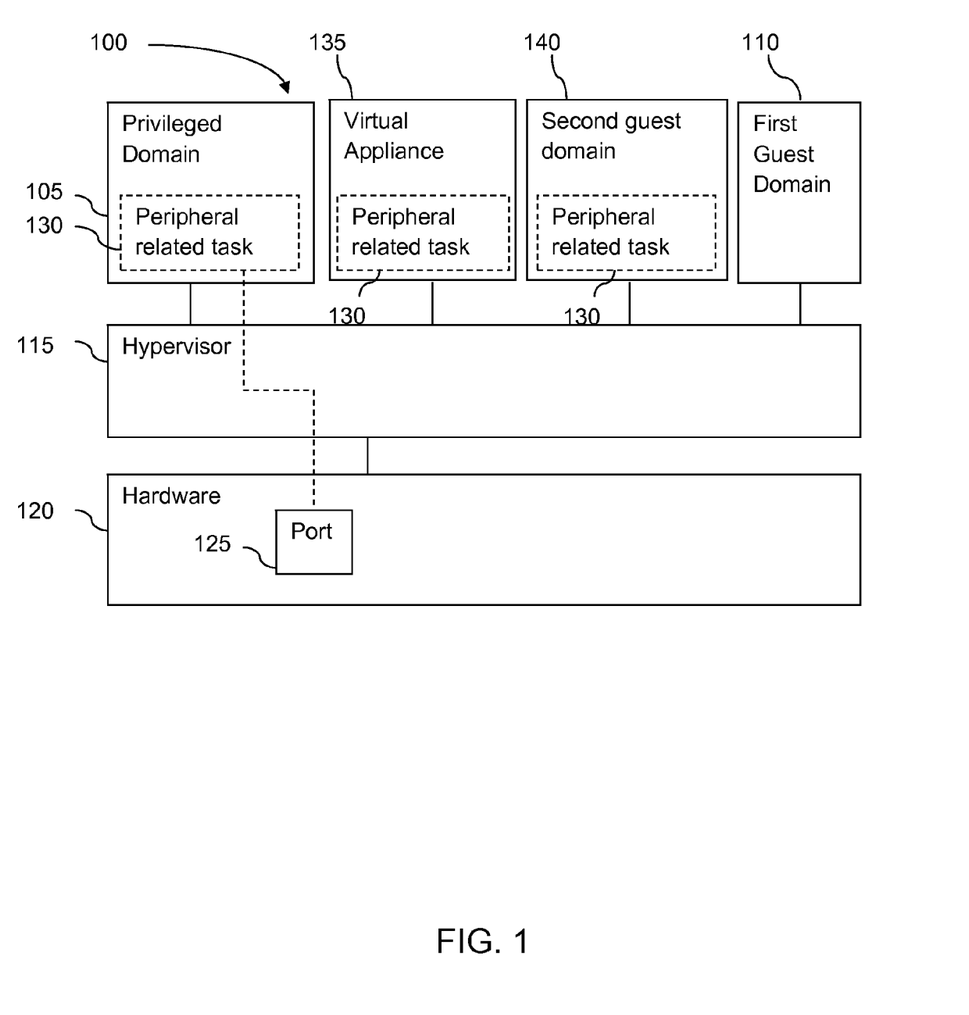
FIG. 1 is a block diagram of a computing device according to an example implementation.

With reference to the figures, FIG. 1 is a block diagram of a computing device 100 according to an example implementation. The computing device 100 can include a first guest domain 110. A privileged domain 105 can be separate from the first guest domain 110. In one example, the privileged domain 105 may not be allowed to execute the peripheral related task 130 and may generate a virtual appliance or another guest domain to execute the peripheral related task 130 to prevent the privileged domain 105 from being attacked by a malicious peripheral. The privileged domain 105 may not allow changes to be made to the privileged domain 105 by other domains that may connect to a potentially malicious peripheral such as a second guest domain 140, or a virtual appliance 135. In another example the privileged domain 105 may be allowed to execute the peripheral related task 130 if the privileged domain 105 is not susceptible to an attack from a malicious peripheral.

The hardware 120 can include a port 125 to connect a peripheral device. A hypervisor 115 can manage the hardware 120 resources. A peripheral related task 130 can be executed in a domain other than the first guest domain for example the privileged domain 105, a virtual appliance 135 or second guest domain 140. The peripheral related task 130 may be instructions to identify the peripheral device. The peripheral related task 130 can prevent the first guest domain 110 from accessing the peripheral if it is determined malicious.

The port 125 is an interface through which data is transferred between a computer and another device. The port can be for example a wired port such as a universal serial bus (USB) port, an IEEE 1394 port, a thunderbolt port, a sata port or another wired connection. The port 125 may be a wireless port such as a Bluetooth® port, a wifi port, a wwan port or another wireless connection. The other device can be a peripheral, for example, a printer, mouse, keyboard, monitor, a storage device, network device or another peripheral.

The hypervisor 115 is a layer for initially communicating directly with hardware 120 replacing the operating system to allow the hardware to run multiple guest operating systems concurrently within multiple domains. In some implementations the hypervisor 115 initiates a domain, such as privileged domain and maps the input/output (I/O) controller to privileged domain to communicate directly with the hardware 120 rather than the hypervisor. In one embodiment, a computer executing a hypervisor may contain three components. The first component is the hypervisor 115 and the second component is the privileged domain 105 which may also be known as domain 0 (Dom0). The privileged domain can be a privileged guest running on the hypervisor 115 with direct hardware access and guest management responsibilities. The third component is a Domain U which can be an unprivileged domain guest (DomU). The DomU can be an Unprivileged guest running on the hypervisor which has no direct access to hardware such as the memory, hard disk, a port or any other hardware 120. The first guest domain can be an example of a DomU.

The peripheral related task 130 can be an application that is executed by a domain. If a peripheral is connected to the port the peripheral may send an indication of what type of device the peripheral is. For example the peripheral may indicate that it is a storage device which may cause the execution of the peripheral related task 130. The execution may be on any of the domains other than the first guest domain such as another guest domain, a virtual appliance, the privileged domain or the hypervisor. For example the peripheral related task may challenge the peripheral by trying to store and retrieve information from the storage device. The task may also scan for malicious content. A peripheral may be malicious when it includes for example a virus, malware or another destructive program that takes advantage of security hole in a domain. A privileged domain is intended to be un-susceptible to viruses and malware, this can be because for example the privileged domain includes trusted software and may not allow writing to the domain by another domain. The privileged domain can execute the peripheral related task 130 for the peripheral device which may cause a malicious code to infect an unprivileged domain but not the privileged domain. Once the peripheral related task 130 has verified that the peripheral is not malicious then an unprivileged domain such as the first guest domain 110 may access the peripheral device. There may be multiple different levels of access that can be given to the first guest domain 110.

Figure 2:
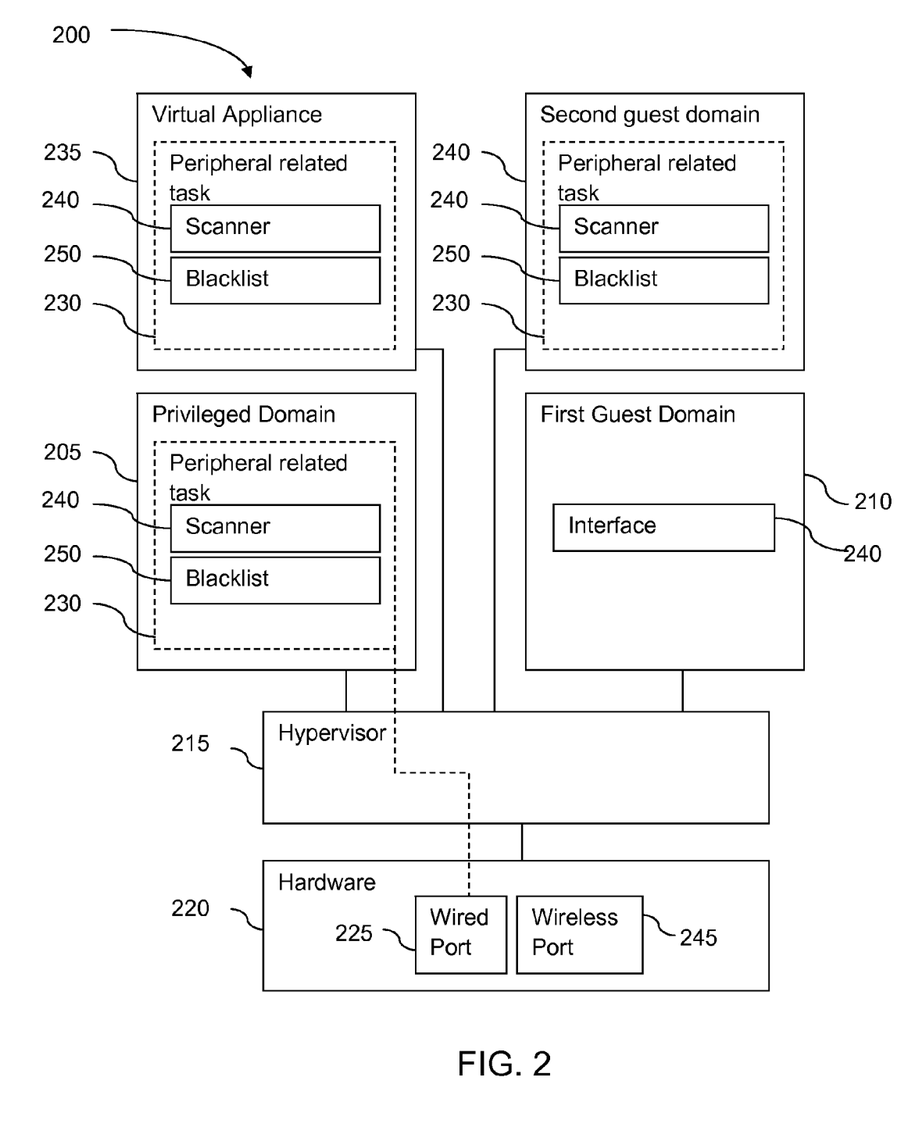
FIG. 2 is a block diagram of a computing device according to an example implementation.

FIG. 2 is a block diagram of a computing device according to an example implementation. The computing device 200 can include, hardware 220 which can include a port such as a wired port 225 or a wireless port 245. The wired port 225 can be for example a universal serial port, an IEEE 1394 port, a thunderbolt port, a sata port or another wired connection. The wireless port 245 can be a port such as a Bluetooth port, a wifi port, a wwan port or another wireless connection.

A domain such as a privileged domain 205 that is outside of and isolated from the first guest domain 210 as a secure quarantine area for all peripheral devices where they can initially be enumerated, analyzed, authenticated, and/or remediated as necessary before being exposed to a user operating environment. In addition, some types of devices may be blocked entirely from the first guest domain 210.

Once the hypervisor maps the I/O controller to the privileged domain then the privileged domain is the domain that first enumerates any peripheral that is presented at the hardware 220 level to a port controller. Policy decisions can be made at this level, but the privileged domain 205 can be a highly secure environment. Because of the highly secure environment the peripheral can be connected to a virtual appliance 235 whose sole purpose is to enforce policy settings related to the peripheral device. This virtual appliance 235 can make a decision on how to, or even whether to, expose the peripheral device to a first guest domain 210 based on pre-configured policy settings related to a number of possible mechanisms, device class authentication, device class configuration policy enforcement, device class white list or black list, specific device white list, abstracted user interaction, device class authentication or another policy setting.

As an example, for USB human interface devices, the privileged domain detects device insertion. Subsequent exposure of said human interface device to first guest domain 210 is delayed until the device is analyzed. The privileged domain treats the device as hostile until it can be authenticated by the peripheral related task as being a device as indicated. For human interface devices, such as a keyboard or mouse, this could be performed by presenting a challenge to the user via the display subsystem. This may be done through the secure graphical user interface so that the challenge is not visible to any guest domains such as the first guest domain 210. The challenge may include presenting random characters to the user as well as a graphical keyboard and waiting for a user to enter the characters by either clicking the correct sequence of buttons on the graphical keypad with the mouse or by entering the characters using the keyboard. The peripheral related task 230 can assure that the resulting input is coming from the device that was inserted. In this way, the peripheral related task can authenticate that the device is indeed acting as a human interface device for the machine operator and not simply posing as a human interface device.

A hypervisor 215 can manage the domains such as the privileged domain 205 and the first guest domain 210. In managing the domains the hypervisor can give the privileged domain access to the wired port 225 or the wireless port 245. This can prevent the first guest domain 210 from accessing a peripheral connected to the wired port 225 or the wireless port 245. In one embodiment the privileged domain has direct access to the hardware 220 and the first guest domain 210 does not have direct access to the hardware 220.

The first guest domain 210 may include an interface that can be used to determine the amount of access the first guest domain 210 has to a peripheral connected to a wired port 225 or a wireless port 245. The first guest domain may have for example full access to the peripheral, may have no access to the peripheral, may receive information about the peripheral in text so that it is sure that malicious instructions are not embedded in the data transfer and received by the first guest domain. The text may be in an ascii format and may be a list of files on the peripheral device if the peripheral device is a storage device. The privileged domain 205 or the peripheral related task may create the list of text representing the files on the peripheral device. A user may then be able to select a file that would be accessible to the first guest domain while others would continue to be identified by a text representation. If a file was selected then the privileged domain 205 could send the file to the first guest domain 210 or could allow the first guest domain 210 to access the peripheral device through the privileged domain 205. This could be done through simple remote procedure call (RPC) or other intra-domain communication mechanisms in which only text information of the files is transferred (filenames, sizes, r/w/x attributes, modification dates, etc.). A dialog could be presented to the user allowing them to either allow the peripheral for full 'insertion' into the file system of the first guest domain 210, rejection of the peripheral, or something in between. An example of "something in between" is the user could decide to transfer to/from the storage device over a communication channel such as text over RPC, rather than allowing it to be inserted into the first guest domain environment as part of the first guest domain's file system.

The peripheral related task may also include logic to determine if an auto run file is on the peripheral device. The logic may be in a privileged domain, virtual appliance or another guest domain and can prevent the first guest domain 210 from accessing the auto run file. An auto run file is a file that a domain may search for when a peripheral device is connected. If an auto run file is detected then the domain may run the application or instructions in the auto run file. If the auto run file was to install malicious software a user may install the malicious software by connecting a peripheral to a port on the computing device 200, however by the peripheral related task 240 removing the auto run file or preventing the first guest domain 210 from accessing the auto run file the first guest domain may not automatically install malicious software from a peripheral device.

The peripheral related task 230 may include or have access to a blacklist 250. The black list 250 may include a list of peripheral devices that the first guest domain 210 is prevented from accessing. The peripheral related task 230 may also have access to a white list which is a list of devices that the system may be able to access without performing task on prior to allowing the first guest domain 210 access to the peripheral.

The privileged domain 205 black list 250 policy can be configured such that all of a certain type of device is blocked from being exposed to the first guest domain 210. For example, a policy may be set to instruct the privileged domain 205 to block all USB mass storage class devices from being exposed to the first guest domain 210.

This policy may include a "learn mode" which can enable an administrator to connect a known good device to a platform, at which time the privileged domain 205 can store the device information for later comparison. In normal operation, whenever a peripheral device was attached to a port, the privileged domain can compare each device to the white list and require a match before passing it to the first guest domain 210. This could be very restrictive in that it can only allow devices with the information such as a serial number already in the white list such that the particular device in the white list worked, or it could be configured to be less restrictive such that the serial number were ignored and all those particular devices can be passed through the first guest domain 210.

The peripheral related task 230 may be able to execute a scanner 240. The scanner 240 can scan the contents of the peripheral device for malicious code prior to allowing access to the peripheral device by the first guest domain 210. For example the scanner may scan the contents of the peripheral device for viruses, malware, or other malicious code. The scanner may be able to remove the viruses from the peripheral prior to giving the first guest domain 210 access to the peripheral device or may allow the first guest domain 210 to access materials that were scanned and shown to be free of a virus or malware.

Figure 3:
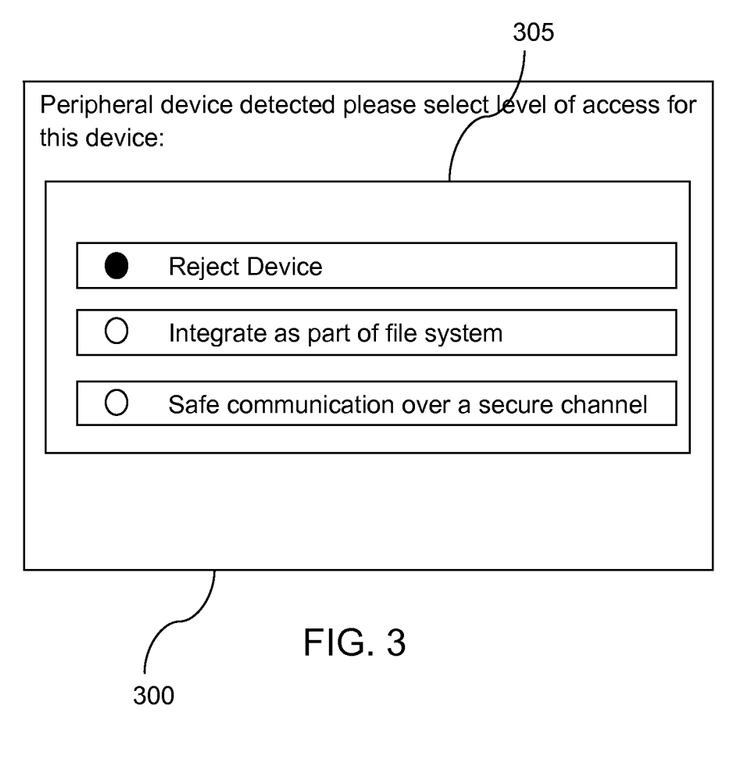
FIG. 3 is an interface according to an example implementation.

FIG. 3 is an interface according to an example implementation. The interface 300 may be a secure graphical user interface. The interface can be used to select the level of access the first guest domain has to communicate with the peripheral device. For example the interface may ask the user to select the level of access for a peripheral device that has been detected by the privileged domain. Examples of the options may be to reject the device, integrate the device as part of the file system, or communicate with the peripheral device over a secure channel. The interface may allow a user to create or manage a policy that is implemented by the peripheral related task or the privileged domain such as creating a white list or black list.

Figure 4:
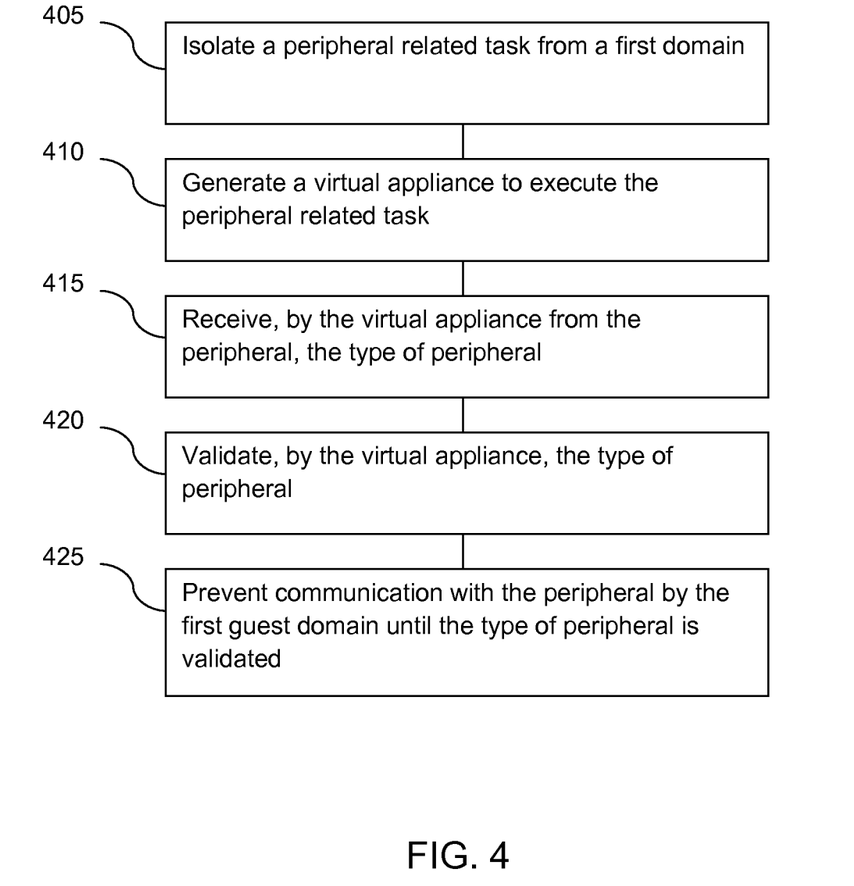
FIG. 4 is a flow diagram of a method of communicating with a peripheral connected to a computing device according to an example implementation.

FIG. 4 is a flow diagram of a method of communicating with a peripheral connected to a computing device according to an example implementation. The method includes isolating a peripheral related task from a first guest domain 210 at 405. The peripheral related task that is isolated from the first guest domain may be a peripheral related task 130. A virtual appliance can be generated at 410 to execute the peripheral related task 130. The generation of the virtual appliance can be initiated by the privileged domain. The virtual appliance can receive from the peripheral an indication of the type of peripheral at 415. The type of peripheral may be for example a storage device, a human interface device such as a keyboard or mouse, or an output device such as a display or printer. The virtual appliance can validate the type of peripheral at 420. The validation may include asking the user to type a random code on the keyboard this can prevent a storage device from identifying itself as a keyboard and causing keyboard input such as starting programs. The communication with the peripheral by the first guest domain can be prevented at 425 until the type of peripheral is validated.

Figure 5:
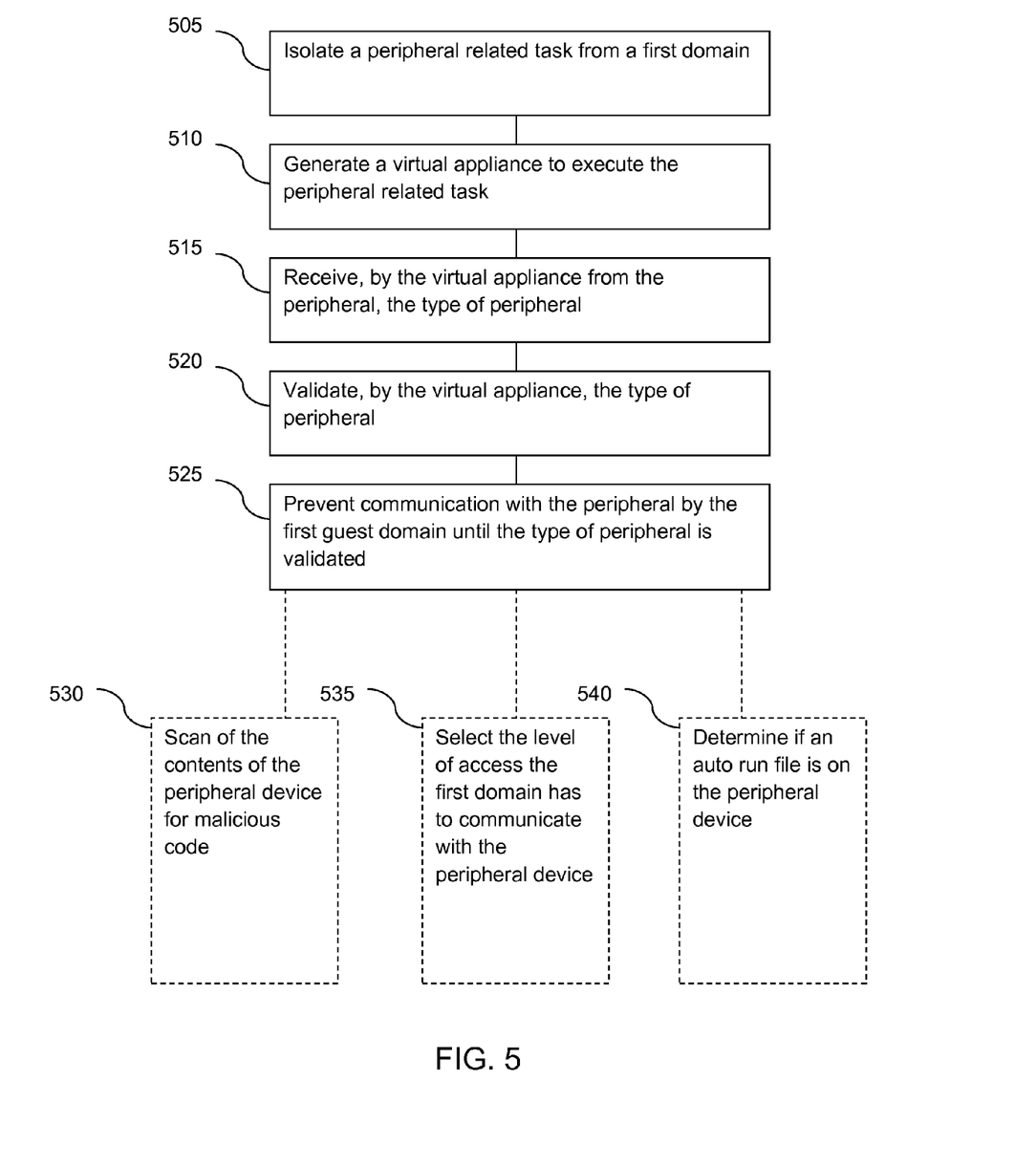
FIG. 5 is a flow diagram of a method of communicating with a peripheral connected to a computing device according to an example implementation.

FIG. 5 is a flow diagram of a method of communicating with a peripheral connected to a computing device according to an example implementation. The method includes isolating a peripheral related task from a first guest domain 210 at 505. The peripheral related task that is isolated from the first guest domain may be a peripheral related task 130. A peripheral related task 130 can be executed at 510 by a virtual appliance. The virtual appliance can perform tasks, such as the peripheral related tasks that may not be executed by a privileged domain. The virtual appliance can receive from the peripheral an indication of the type of peripheral at 515. The type of peripheral may be for example a storage device, a human interface device such as a keyboard or mouse, or an output device such as a display or printer. The virtual appliance can validate the type of peripheral at 520. The validation may include asking the user to type a random code on the keyboard. This can prevent a storage device from identifying itself as a keyboard and causing keyboard input such as starting programs. The communication with the peripheral by the first guest domain 110 can be prevented at 525 until the type of peripheral is validated.

The method can include scanning the contents of the peripheral device for malicious code prior to allowing access to the peripheral device by the first guest domain at 530. The scan of the malicious code may include a virus scan, malware scan or another scan. The level of access the first guest domain has to communicate with the peripheral device can be selected at 535. The level of access can be based on policies implemented by the peripheral related task. The policies may be predetermined or may be selected by the user of the first guest domain. The method may include determining if an auto run file is on the peripheral device at 540. The peripheral related task can prevent the first guest domain from accessing the auto run file. The peripheral related task may remove the auto run file, prevent access to the auto run file by the first guest domain, or allow only secure communications with the files on the peripheral device such as only showing an ascii text based listing of the files on the peripheral device.

Figure 6:
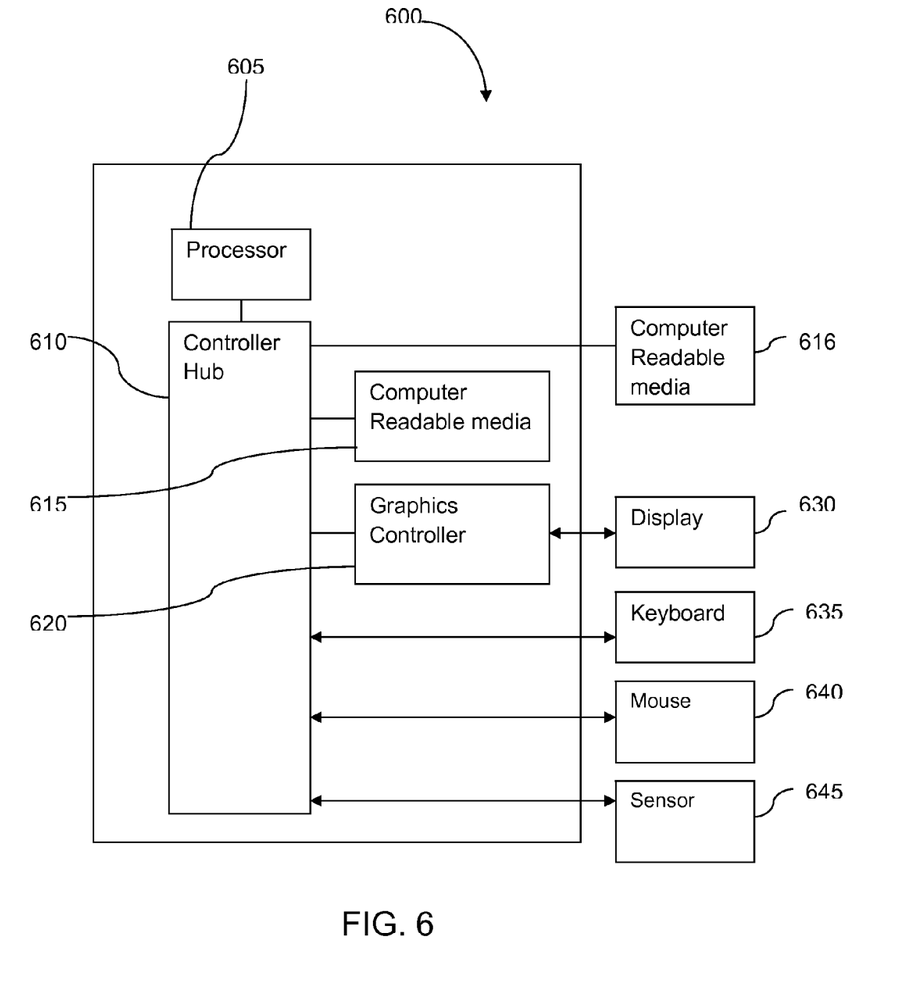
FIG. 6 is a computing system including a computer readable medium according to an example implementation.

FIG. 6 is a computing system including a computer readable medium according to an example implementation. The non-transitory computer readable 615 or 616 medium can include code such as a domain or a peripheral related task that can be executed by a processor 605. The processor 605 can be connected to a controller hub 610. The controller hub can connect to the display 630 through a graphics controller 620, a keyboard 635, a mouse 640 and a sensor 645 such as a webcam. The keyboard 635, mouse 640, display 630, sensor 645 and computer readable media 615 and 616 are some examples of peripherals devices that can be connected to the computing device 600 through a port.

The controller hub may include the port or there may be other components between the peripheral and the controller hub 610 that allows communication between the peripheral and the processor 605.

The privileged domain if executed can cause a computing device to isolate a peripheral related task from a first guest domain. The privileged domain can cause a virtual appliance to be generated to execute the peripheral related task. The virtual appliance can receive from the peripheral an indication of the type of peripheral. The peripheral related task can validate the type of peripheral and prevent communication with the peripheral by the first guest domain until the type of peripheral is validated. The peripheral related task may scan the contents of the peripheral device for malicious code prior to allowing access to the peripheral device by the first guest domain. The peripheral related task may allow the selection, through an interface, of the level of access the first guest domain has to communicate with the peripheral device.

The techniques described above may be embodied in a computer-readable medium for configuring a computing system to execute the method. The computer readable media may include, for example and without limitation, any number of the following: magnetic storage media including the disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and various types of computer-readable media may be used to store the software modules discussed herein. Computing systems may be found in many forms including but not limited to mainframes, minicomputers, servers, workstations, personal computers, notepads, personal digital assistants, various wireless devices and embedded systems, just to name a few.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A computing device comprising:
   a virtual machine monitor (VMM);
   a plurality of virtual domains isolated from one another by the VMM, the VMM to manage the plurality of virtual domains that comprise a first guest domain and a privileged domain;
   peripheral related instructions isolated from the first guest domain; and
   a port to connect a peripheral device,
   the privileged domain to cause execution of the peripheral related instructions in a given virtual domain of the plurality of virtual domains managed by the VMM, the given virtual domain being different from the first guest domain, wherein the peripheral related instructions upon execution in the given domain validate a type of the peripheral device to control communication of the first guest domain with the peripheral device.

2. The computing device of claim 1, wherein the peripheral related instructions upon execution in the given virtual domain prevent communication of the first guest domain with the peripheral device responsive to the validating indicating that the type of the peripheral device does not match a specified type.

3. The computing device of claim 1, wherein the port is a wired or a wireless port.

4. The computing device of claim 1, further comprising a storage medium to store a blacklist of peripheral devices the first guest domain is prevented from accessing.

5. The computing device of claim 1, further comprising a scanner to scan contents of the peripheral device for malicious code prior to allowing access to the peripheral device by the first guest domain, wherein the peripheral related instructions upon execution cause execution of the scanner.

6. The computing device of claim 1, further comprising an interface to select a level of access from among a plurality of levels of access that the first guest domain has to communicate with the peripheral device.

7. The computing device of claim 1, wherein the validating of the type of the peripheral device comprises:
   prompting a user to make an input on the peripheral device;
   detecting the input; and
   determining the type of the peripheral device in response to the input.

8. The computing device of claim 1, wherein the validating of the type of the peripheral device comprises:
   comparing a type of the peripheral device identified by the peripheral device with a determined type of the peripheral device.

9. The computing device of claim 1, wherein the given virtual domain in which the peripheral related instructions are executable is the privileged domain or another guest domain of the plurality of virtual domains.

10. A method of communicating with a peripheral device connected to a computing device, comprising:
    isolating, by a virtual machine monitor (VMM) in the computing device, a plurality of virtual domains from one another, the plurality of virtual domains comprising a first guest domain and a privileged domain;
    isolating peripheral related instructions from the first guest domain;
    generating, by the privileged domain, a virtual appliance to execute the peripheral related instructions;
    receiving, by the virtual appliance from the peripheral device, a type of the peripheral device; and
    validating, by the peripheral related instructions executed in the virtual appliance, the type of peripheral device.

11. The method of claim 10, further comprising causing, by the peripheral related instructions executed in the virtual appliance, scanning of contents of the peripheral device for malicious code.

12. The method of claim 10, further comprising selecting a level of access from among a plurality of levels of access that the first guest domain has to communicate with the peripheral device.

13. The method of claim 10, wherein validating of the type of the peripheral device comprises:
    prompting a user to make an input on the peripheral device;
    detecting the input; and
    determining the type of the peripheral device in response to the input.

14. The method of claim 10, wherein validating the type of the peripheral device comprises:

comparing a type of the peripheral device identified by the peripheral device with a determined type of the peripheral device.

15. The method of claim 10, further comprising controlling, by the peripheral related instructions executed in the virtual appliance, communication of the first guest domain with the peripheral device based on the validating of the type of the peripheral device, wherein the peripheral related instructions prevent communication of the first guest domain with the peripheral device responsive to the validating indicating that the type of the peripheral device does not match a specified type.

16. A non-transitory computer readable medium comprising instructions that upon execution cause a computing device to:
 isolate, by a virtual machine monitor (VMM) in the computing device, a plurality of virtual domains from one another, the plurality of virtual domains managed by the VMM and comprising a first guest domain and a privileged domain;
 isolate peripheral related instructions from the first guest domain;
 cause, by the privileged domain, execution of the peripheral related instructions in a given virtual domain of the plurality of virtual domains, the given virtual domain being different from the first guest domain;
 receive, from a peripheral device by the peripheral related instructions executed in the given virtual domain, a type of the peripheral device; and
 validate, by the peripheral related instructions executed in the given virtual domain, the type of peripheral device to control communication of the first guest domain with the peripheral device.

17. The non-transitory computer readable medium of claim 16, wherein the peripheral related instructions executed in the given virtual domain prevent communication of the first guest domain with the peripheral device responsive to the validating indicating that the type of the peripheral device does not match a specified type.

18. The non-transitory computer readable medium of claim 16, wherein validating of the type of the peripheral device comprises:
 prompting a user to make an input on the peripheral device;
 detecting the input; and
 determining the type of the peripheral device in response to the input.

19. The non-transitory computer readable medium of claim 16, wherein validating the type of the peripheral device comprises:
 comparing a type of the peripheral device identified by the peripheral device with a determined type of the peripheral device.

20. The non-transitory computer readable medium of claim 16, wherein the given virtual domain in which the peripheral related instructions are executable is the privileged domain or another guest domain of the plurality of virtual domains.

* * * * *